(12) United States Patent
Zhang

(10) Patent No.: US 11,293,768 B2
(45) Date of Patent: Apr. 5, 2022

(54) SYSTEMS AND METHODS FOR PATH DETERMINATION

(71) Applicant: BEIJING DIDI INFINITY TECHNOLOGY AND DEVELOPMENT CO., LTD., Beijing (CN)

(72) Inventor: Yu Zhang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/105,515

(22) Filed: Nov. 26, 2020

(65) Prior Publication Data

US 2021/0080271 A1    Mar. 18, 2021

Related U.S. Application Data

(63) Continuation of application No. PCT/CN2018/090194, filed on Jun. 7, 2018.

(51) Int. Cl.
*G01C 21/34* (2006.01)
*G06Q 10/04* (2012.01)
*G06Q 50/30* (2012.01)

(52) U.S. Cl.
CPC ..... *G01C 21/3438* (2013.01); *G01C 21/3446* (2013.01); *G06Q 10/047* (2013.01); *G06Q 50/30* (2013.01)

(58) Field of Classification Search
CPC .. G01C 21/34; G01C 21/343; G01C 21/3438; G01C 21/3446; G06Q 10/047
See application file for complete search history.

(56) References Cited

U.S. PATENT DOCUMENTS

| 2010/0114472 A1* | 5/2010 | Oumi | G01C 21/3476 |
| | | | 701/532 |
| 2013/0158861 A1* | 6/2013 | Lerenc | G01C 21/3438 |
| | | | 701/410 |

(Continued)

FOREIGN PATENT DOCUMENTS

| CN | 103712629 A | 4/2014 |
| CN | 104866903 A | 8/2015 |

(Continued)

OTHER PUBLICATIONS

International Search Report in PCT/CN2018/090194 dated Feb. 28, 2019, 5 pages.

(Continued)

*Primary Examiner* — Spencer D Patton
(74) *Attorney, Agent, or Firm* — Metis IP LLC

(57) ABSTRACT

The present disclosure relates to a system and method for determining an optimized route for a carpool service. The method may include stringing a plurality of nodes to generate a plurality of first candidate paths. The method may also include determining a geographical length for each of the plurality of first candidate paths based on geographical distances between any two of the plurality of nodes. The method may also include determining one or more second candidate paths among the plurality of first candidate paths based on the geographical length for each of the plurality of first candidate path. The method may also include determining the navigation length for each of the one or more second candidate paths. The method may also include determining a target path among the one or more second candidate paths based on the navigation length.

10 Claims, 9 Drawing Sheets

(56) References Cited

U.S. PATENT DOCUMENTS

2016/0047661 A1 2/2016 Yeo et al.
2018/0080794 A1 3/2018 Wang
2020/0300657 A1 9/2020 Wang

FOREIGN PATENT DOCUMENTS

| CN | 104931063 A | 9/2015 |
| CN | 105318882 A | 2/2016 |
| CN | 106202114 A | 12/2016 |
| CN | 106855415 A | 6/2017 |
| CN | 107203190 A | 9/2017 |
| CN | 107367278 A | 11/2017 |
| CN | 107560619 A | 1/2018 |
| CN | 107677269 A | 2/2018 |
| EP | 1471329 A2 | 10/2004 |
| GB | 2397683 A | 7/2004 |
| JP | 2008126779 A | 6/2008 |
| JP | 2010169476 A | 6/2010 |
| WO | 2018085308 A | 5/2018 |

OTHER PUBLICATIONS

Written Opinion in PCT/CN2018/090194 dated Feb. 28, 2019, 5 pages.
First Office Action in Chinese Application No. 201880038848.4 dated Mar. 26, 2020, 19 pages.
The Extended European Search Report in European Application No. 18921582.5 dated Oct. 13, 2020, 8 Pages.
Notice of Reasons for Rejection in Japanese Application No. 2020540532 dated Aug. 16, 2021, 11 pages.
First Office Action in Russian Application No. 2020143702 dated Sep. 6, 2021, 17 pages.
First Office Action in Chinese Application No. 202010847381.2 dated Jan. 5, 2022, 12 pages.
Yu, Xinyi et al., Express Delivery Path Planning for Mobile Terminals Based on Linear Temporal Logic, High Technology Letters, 27(6): 544-553.
Ashish, Shrestha et al., Optimal Grid Network for Rural Electrification of Upper Karnali Hydro Project Affected Area, 2016 IEEE Region 10 Humanitarian Technology Conference (R10-HTC), 2017, 5 pages.

* cited by examiner

700

```
┌─────────────────────────────────────────────┐
│ Determining a plurality of first differences between
│ the geographical length of the reference path and     │ ─ 710
│ geographical length of each of the plurality of first │
│ candidate paths                                        │
└─────────────────────────────────────────────┘
                    │
                    ▼
┌─────────────────────────────────────────────┐
│ Determining a first parameter based on a difference   │
│ between the navigation length of the reference path   │ ─ 720
│ and the geographical length of the reference path     │
└─────────────────────────────────────────────┘
                    │
                    ▼
┌─────────────────────────────────────────────┐
│ Assigning a corresponding first candidate path as a   │
│ second candidate path if a first difference of the    │ ─ 730
│ corresponding first candidate path is smaller than the│
│ first parameter                                        │
└─────────────────────────────────────────────┘
```

Obtaining a reference section set including a plurality of sections of the reference path ⟋ 810

Determining a navigation length of each section in the reference section set to determine the navigation length of the reference path ⟋ 820

FIG. 8

SYSTEMS AND METHODS FOR PATH DETERMINATION

CROSS-REFERENCE TO RELATED APPLICATIONS

The present application is a Continuation of International Application No. PCT/CN2018/090194 filed on Jun. 7, 2018, the entire contents of which are incorporated herein by reference.

TECHNICAL FIELD

The present disclosure generally relates to online to offline service platforms, and in particular, to systems and methods for determining an optimized route for a carpool service.

BACKGROUND

With the development of Internet technology, online to offline services, such as online taxi hailing services and delivery services, play a more and more significant role in people's daily lives. In the case of a scheduled carpooling service, a driver needs to pass through the driver's starting point, a starting point and an ending point of each of the passengers, and finally reach the last passenger's ending point. This is a typical vehicle routing planning (VRP) problem, which needs to consider the order of deliveries to achieve the shortest travel distance. In the process of solve the problem, it is often necessary to frequently request navigation distance calculation service to calculate the distance between any two points in a travel path. Such resources are valuable and in some cases costly. Thus, it is desirable to develop effective systems and methods to improve the response speed of the server to service order and save the computing resources.

SUMMARY

According to an aspect of the present disclosure, a system may include at least one non-transitory computer-readable storage medium storing a set of instructions and at least one processor in communication with the at least one non-transitory computer-readable storage medium. When executing the set of instructions, the at least one processor may cause the system to string a plurality of nodes to generate a plurality of first candidate paths. The plurality of nodes may be determined based on one or more requests, and the plurality of first candidate paths may satisfy a first condition related to the plurality of nodes. The at least one processor may also cause the system to determine one or more second candidate paths among the plurality of first candidate paths based on the geographical length for each of the plurality of first candidate path. The at least one processor may also cause the system to determine the navigation length for each of the one or more second candidate paths. The at least one processor may also cause the system to determine a target path among the one or more second candidate paths based on the navigation length. The navigation length of the target path may be the shortest among the one or more second candidate paths.

In some embodiment, to generate one or more second candidate paths, the at least one processor may also cause the system to determine a reference path among the plurality of first candidate paths. The geographical length of the reference path may be the shortest among the plurality of first candidate paths. The at least one processor may also cause the system to determine a navigation length for the reference path based on navigation length between neighboring nodes in the reference path. The at least one processor may also cause the system to determine the one or more second candidate paths. The geographical length of a second candidate path may be shorter than the navigation length of the reference path.

In some embodiments, each request may include a starting node and a destination node, and the first condition may be that priority of a starting node in a first candidate path is higher than that of the destination node in the first candidate path.

In some embodiments, to generate a plurality of first candidate paths, the at least one processor may also cause the system to determine an initial circuit based on the plurality of nodes. The initial circuit may be an Euler circuit with a first node sequence. The at least one processor may also cause the system to determine a plurality of second node sequences based on the first node sequence and the first condition related to the plurality of nodes. The at least one processor may also cause the system to determine the plurality of the first candidate paths based on the plurality of second node sequences.

In some embodiments, the Euler circuit may be determined based on a Christofides algorithm.

In some embodiments, the plurality of second node sequences may be determined based on a 2-optimization algorithm.

In some embodiments, to determine the one or more second candidate paths among the plurality of first candidate paths, the at least one processor may also cause the system to determine a plurality of first differences between the geographical length of the reference path and geographical length of each of the plurality of first candidate paths. The at least one processor may also cause the system to determine a first parameter based on a difference between the navigation length of the reference path and the geographical length of the reference path. The at least one processor may also cause the system to assign a corresponding first candidate path as a second candidate paths if a first difference of the corresponding first candidate path is smaller than the first parameter.

In some embodiments, each of the second candidate paths may include one or more sections. Each section may be connect two neighboring nodes of the second candidate path. To determine a navigation length for the reference path, the at least one processor may also cause the system to obtain a reference section set including a plurality of sections of the reference path. The at least one processor may also cause the system to determine the navigation length of each section in the reference section set to determine the navigation length of the reference path.

In some embodiments, to determine the navigation length for each of the one or more second candidate paths, the at least one processor may also cause the system to determine one or more different sections between the reference path and the second candidate path. The at least one processor may also cause the system to add the one or more different sections into the reference section set. The at least one processor may also cause the system to determine the navigation length of the second candidate path based on the reference section set.

In some embodiments, a section of the second candidate path may be not a different section if the node sequence of the section of the second candidate path is opposite to a node sequence of a section of the reference path, and a difference between the navigation length and the geographic length of the section does not exceed a threshold.

According to another aspect of the present disclosure, a computer-implemented method may include one or more of the following operations performed by at least one processor. The method may include stringing a plurality of nodes to generate a plurality of first candidate paths. The plurality of nodes may be determined based on one or more requests, and the plurality of first candidate paths may satisfy a first condition related to the plurality of nodes. The method may also include determining a geographical length for each of the plurality of first candidate paths based on geographical distances between any two of the plurality of nodes. The method may also include determining one or more second candidate paths among the plurality of first candidate paths based on the geographical length for each of the plurality of first candidate path. The method may also include determining the navigation length for each of the one or more second candidate paths. The method may also include determining a target path among the one or more second candidate paths based on the navigation length. The navigation length of the target path may be the shortest among the one or more second candidate paths.

According to yet another aspect of the present disclosure, a non-transitory machine-readable storage medium storing instructions that, when executed by at least one processor of a system, cause the system to perform a method. The method may include stringing a plurality of nodes to generate a plurality of first candidate paths. The plurality of nodes may be determined based on one or more requests, and the plurality of first candidate paths may satisfy a first condition related to the plurality of nodes. The method may also include determining a geographical length for each of the plurality of first candidate paths based on geographical distances between any two of the plurality of nodes. The method may also include determining one or more second candidate paths among the plurality of first candidate paths based on the geographical length for each of the plurality of first candidate path. The method may also include determining the navigation length for each of the one or more second candidate paths. The method may also include determining a target path among the one or more second candidate paths based on the navigation length. The navigation length of the target path may be the shortest among the one or more second candidate paths.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is a flowchart illustrating an exemplary process for determining a second candidate path according to some embodiments of the present disclosure;

FIG. 8 is a flowchart illustrating an exemplary process for determining the navigation length for the reference path according to some embodiments of the present disclosure.

DETAILED DESCRIPTION

Figure 1:
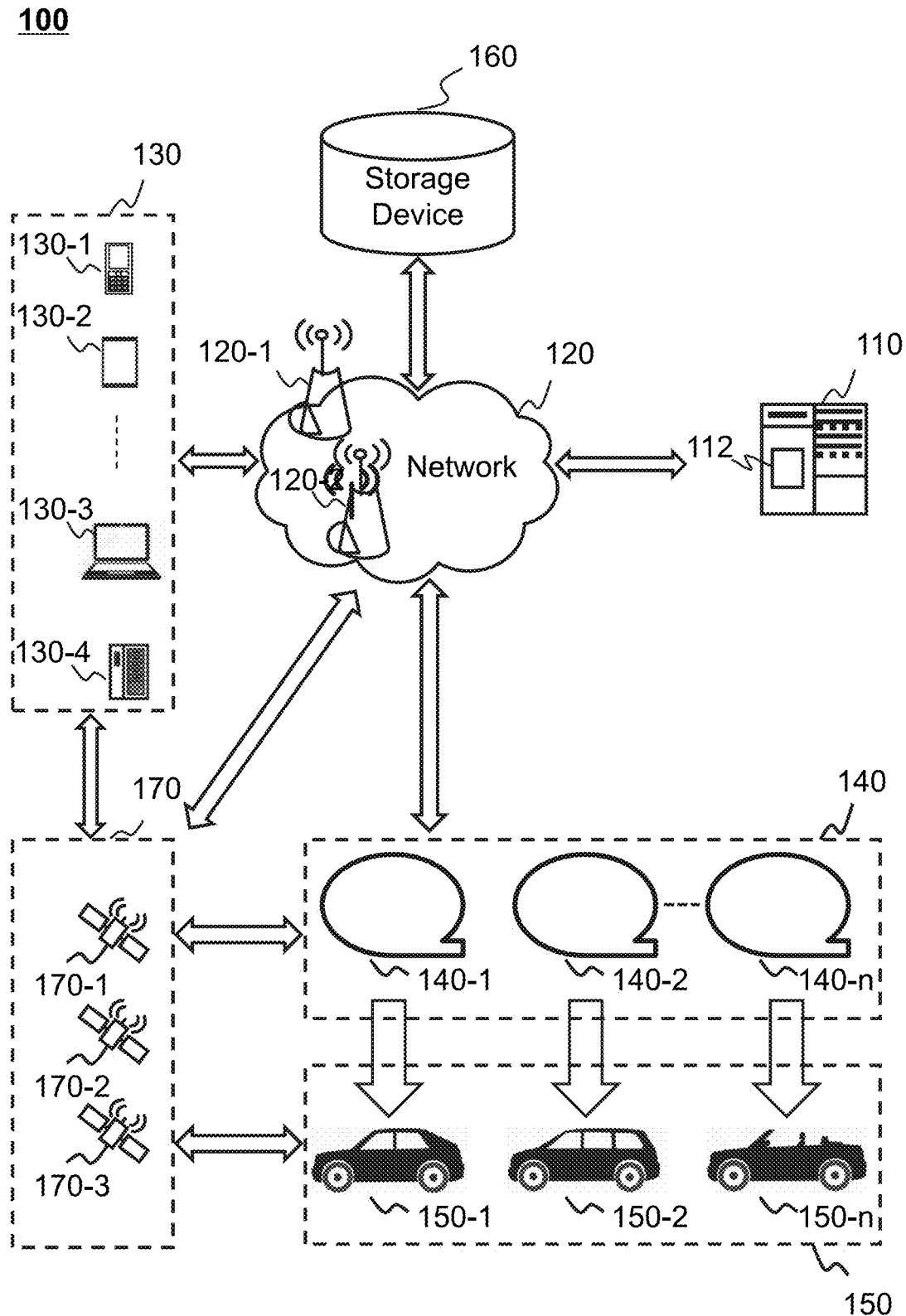
FIG. 1 is a block diagram illustrating an exemplary online to offline service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to distributing a request for a transportation service, it should also be understood that the present disclosure is not intended to be limiting. The system or method of the present disclosure may be applied to any other kind of online to offline service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may be implemented on a user device and include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity, or a tool that may request or order a service. Also, the term "driver," "provider," and "service provider" in the present disclosure are used interchangeably to refer to an individual, an entity, or a tool that may provide a service or facilitate the providing of the service.

The term "service request," "request for a service," "requests," and "order" in the present disclosure are used interchangeably to refer to a request that may be initiated by a passenger, a service requester, a customer, a driver, a provider, a service provider, or the like, or any combination thereof. The service request may be accepted by any one of a passenger, a service requester, a customer, a driver, a provider, or a service provider. The service request may be chargeable or free.

The term "service provider terminal" and "driver terminal" in the present disclosure are used interchangeably to refer to a mobile terminal that is used by a service provider to provide a service or facilitate the providing of the service. The term "service requester terminal" and "passenger terminal" in the present disclosure are used interchangeably to refer to a mobile terminal that is used by a service requester to request or order a service.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (Wi-Fi) positioning technology, or the like, or any combination thereof. One or more of the above positioning systems may be used interchangeably in the present disclosure.

An aspect of the present disclosure relates to systems and methods for determine a target path for an online to offline service. The system may obtain a plurality of nodes based on one or more requests. The system may string the plurality of nodes to generate a plurality of first candidate paths. The plurality of first candidate paths satisfy a first condition related to the plurality of nodes. The system may determine a geographical length for each of the plurality of first candidate paths based on geographical distances between any two of the plurality of nodes. The system may determine a reference path among the plurality of first candidate paths. The geographical length of the reference path may be the shortest among the plurality of first candidate paths. The system may determine a navigation length for the reference path based on navigation length between neighboring nodes in the reference path. The system may determine one or more second candidate paths among the plurality of first candidate paths. The geographical length of a second candidate path is shorter than the navigation length of the reference path. The system may determine the navigation length for each of the one or more second candidate paths. The system may determine a target path among the one or more second candidate paths based on the navigation length. The navigation length of the target path may be the shortest among the one or more second candidate paths.

It should be noted that online to offline service, such as online taxi-hailing, is a new form of service rooted only in post-Internet era. It provides technical solutions to users and service providers that could raise only in post-Internet era. In pre-Internet era, when a user hails a taxi on street, the taxi request and acceptance occur only between the passenger and one taxi driver that sees the passenger. If the passenger hails a taxi through a telephone call, the service request and acceptance by a service provider may occur only between the passenger and the service provider (e.g., a taxi company or agent). Online taxi, however, allows a user of the service to reserve a service and automatic distribute the reservation service request to a vast number of individual service providers (e.g., taxi drivers) distance away from the user. It also allows a plurality of service providers to respond the service request simultaneously and in real-time. Therefore, through the Internet, the online to offline service systems may provide a much more efficient transaction platform for the users and the service providers that may never meet in a traditional pre-Internet transportation service system. Allocating appointment orders provides a service for both requesters and service providers efficiently.

FIG. 1 is a block diagram illustrating an exemplary online to offline service system 100 according to some embodiments of the present disclosure. For example, the online to offline service system 100 may be an online to offline service platform for transportation services. The online to offline service system 100 may include a server 110, a network 120, a service requester terminal 130, a service provider terminal 140, a vehicle 150, a storage device 160, and a navigation system 170.

The online to offline service system 100 may provide a plurality of services. Exemplary service may include a taxi-hailing service, a chauffeur service, an express car service, a carpool service, a bus service, a driver hire service, and a shuttle service. In some embodiments, the online to offline service may be any on-line service, such as booking a meal, shopping, or the like, or any combination thereof.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the service requester terminal 130, the service provider terminal 140, and/or the storage device 160 via the network 120. As another example, the server 110 may be directly connected to the service requester terminal 130, the service provider terminal 140, and/or the storage device 160 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data related to the service request to perform one or more functions described in the present disclosure. For example, the processing engine 112 may determine a target path for the service request received from the service requester terminal 130. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the online to offline service system 100 (e.g., the server 110, the service requester terminal 130, the service provider terminal 140, the vehicle 150, the storage device 160, and the navigation system 170) may transmit information and/or data to other component(s) of the online to offline service system 100 via the network 120. For example, the server 110 may receive a service request from the service requester terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online to offline service system 100 may be connected to the network 120 to exchange data and/or information.

In some embodiments, a passenger may be an owner of the service requester terminal 130. In some embodiments, the owner of the service requester terminal 130 may be someone other than the passenger. For example, an owner A of the service requester terminal 130 may use the service requester terminal 130 to transmit a service request for a passenger B or receive a service confirmation and/or information or instructions from the server 110. In some embodiments, a service provider may be a user of the service provider terminal 140. In some embodiments, the user of the service provider terminal 140 may be someone other than the service provider. For example, a user C of the service provider terminal 140 may use the service provider terminal 140 to receive a service request for a service provider D, and/or information or instructions from the server 110. In some embodiments, "passenger" and "passenger terminal" may be used interchangeably, and "service provider" and "service provider terminal" may be used interchangeably. In some embodiments, the service provider terminal may be associated with one or more service providers (e.g., a night-shift service provider, or a day-shift service provider).

In some embodiments, the service requester terminal 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glasses, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google™ Glass, an Oculus Rift, a HoloLens, a Gear VR, etc. In some embodiments, the built-in device in the vehicle 130-4 may include an onboard computer, an onboard television, etc. In some embodiments, the service requester terminal 130 may be a device with positioning technology for locating the position of the passenger and/or the service requester terminal 130.

The service provider terminal 140 may include a plurality of service provider terminals 140-1, 140-2, . . . , 140-n. In some embodiments, the service provider terminal 140 may be similar to, or the same device as the service requester terminal 130. In some embodiments, the service provider terminal 140 may be customized to be able to implement the online to offline service. In some embodiments, the service provider terminal 140 may be a device with positioning technology for locating the service provider, the service provider terminal 140, and/or a vehicle 150 associated with the service provider terminal 140. In some embodiments, the service requester terminal 130 and/or the service provider terminal 140 may communicate with another positioning device to determine the position of the passenger, the service requester terminal 130, the service provider, and/or the service provider terminal 140. In some embodiments, the service requester terminal 130 and/or the service provider terminal 140 may periodically transmit the positioning information to the server 110. In some embodiments, the service provider terminal 140 may also periodically transmit the availability status to the server 110. The availability status may indicate whether a vehicle 150 associated with the service provider terminal 140 is available to carry a passenger. For example, the service requester terminal 130 and/or the service provider terminal 140 may transmit the positioning information and the availability status to the server 110 every thirty minutes. As another example, the service requester terminal 130 and/or the service provider terminal 140 may transmit the positioning information and the availability status to the server 110 each time the user logs into the mobile application associated with the online to offline service.

In some embodiments, the service provider terminal 140 may correspond to one or more vehicles 150. The vehicles 150 may carry the passenger and travel to the destination. The vehicles 150 may include a plurality of vehicles 150-1, 150-2, . . . , 150-n. One vehicle may correspond to one type of services (e.g., a taxi-hailing service, a chauffeur service, an express car service, a carpool service, a bus service, a driver hire service, or a shuttle service).

The storage device 160 may store data and/or instructions. In some embodiments, the storage device 160 may store data obtained from the service requester terminal 130 and/or the service provider terminal 140. In some embodiments, the storage device 160 may store data and/or instructions that the server 110 may execute or use to perform exemplary methods described in the present disclosure. In some embodiments, storage device 160 may include a mass storage, removable storage, a volatile read-and-write memory, a read-only memory (ROM), or the like, or any combination thereof. Exemplary mass storage may include a magnetic disk, an optical disk, solid-state drives, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 160 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 160 may be connected to the network 120 to communicate with one or more components of the online to offline service system 100 (e.g., the server 110, the service requester terminal 130, or the service provider terminal 140). One or more components of the online to offline service system 100 may access the data or instructions stored in the storage device 160 via the network 120. In some embodiments, the storage device 160 may be directly connected to or communicate with one or more components of the online to offline service system 100 (e.g., the server 110, the service requester terminal 130, the service provider terminal 140). In some embodiments, the storage device 160 may be part of the server 110.

The navigation system 170 may determine information associated with an object, for example, one or more of the service requester terminal 130, the service provider terminal 140, the vehicle 150, etc. In some embodiments, the navigation system 170 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The navigation system 170 may include one or more satellites, for example, a satellite 170-1, a satellite 170-2, and a satellite 170-3. The satellites 170-1 through 170-3 may determine the information mentioned above independently or jointly. The satellite navigation system 170 may transmit the information mentioned above to the network 120, the service requester terminal 130, the service provider terminal 140, or the vehicle 150 via wireless connections.

In some embodiments, one or more components of the online to offline service system 100 (e.g., the server 110, the service requester terminal 130, the service provider terminal 140) may have permissions to access the storage device 160. In some embodiments, one or more components of the online to offline service system 100 may read and/or modify information related to the passenger, service provider, and/or the public when one or more conditions are met. For example, the server 110 may read and/or modify one or more passengers' information after a service is completed. As another example, the server 110 may read and/or modify one or more service providers' information after a service is completed.

In some embodiments, information exchanging of one or more components of the online to offline service system 100 may be initiated by way of requesting a service. The object of the service request may be any product. In some embodiments, the product may include food, medicine, commodity, chemical product, electrical appliance, clothing, car, housing, luxury, or the like, or any combination thereof. In some other embodiments, the product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

One of ordinary skill in the art would understand that when an element (or component) of the online to offline service system 100 performs, the element may perform through electrical signals and/or electromagnetic signals. For example, when a service requester terminal 130 transmits out a service request to the server 110, a processor of the service requester terminal 130 may generate an electrical signal encoding the request. The processor of the service requester terminal 130 may then transmit the electrical signal to an output port. If the service requester terminal 130 communicates with the server 110 via a wired network, the output port may be physically connected to a cable, which further may transmit the electrical signal to an input port of the server 110. If the service requester terminal 130 communicates with the server 110 via a wireless network, the output port of the service requester terminal 130 may be one or more antennas, which convert the electrical signal to electromagnetic signal. Similarly, a service provider terminal 130 may receive an instruction and/or service request from the server 110 via electrical signal or electromagnet signals. Within an electronic device, such as the service requester terminal 130, the service provider terminal 140, and/or the server 110, when a processor thereof processes an instruction, transmits out an instruction, and/or performs an action, the instruction and/or action is conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
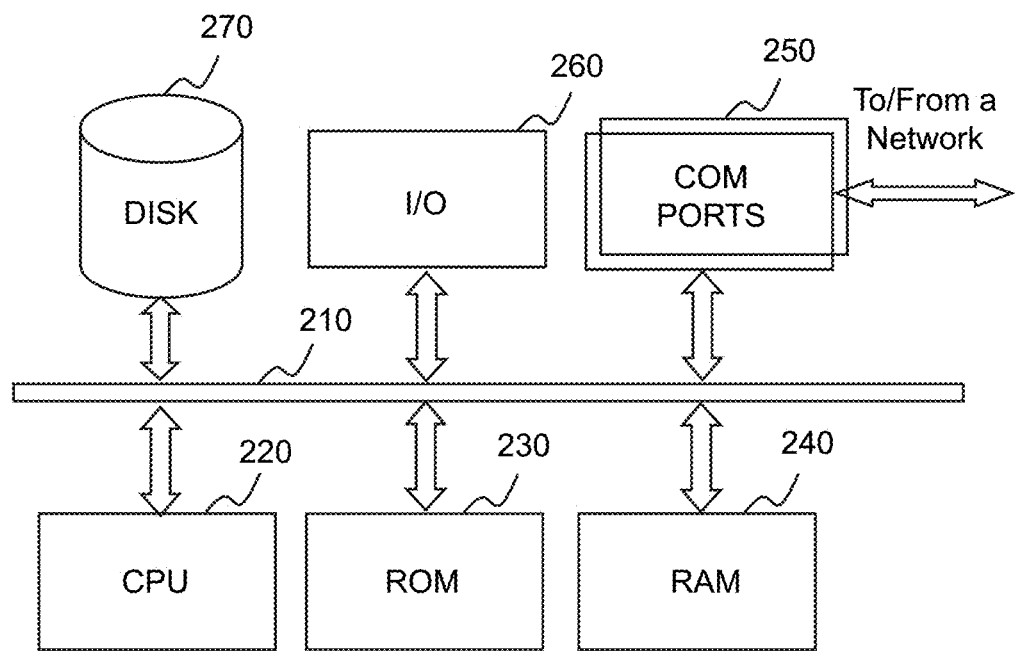
FIG. 2 is a schematic diagram illustrating exemplary hardware and software components of an exemplary computing device according to some embodiments of the present disclosure.

FIG. 2 is a schematic diagram illustrating exemplary hardware and software components of a computing device 200 on which the server 110, the service requester terminal 130, and/or the service provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a special purpose computer in some embodiments. The computing device 200 may be used to implement an online to offline system for the present disclosure. The computing device 200 may implement any component of the online to offline service as described herein. In FIGS. 1-2, only one such computer device is shown purely for convenience purposes. One of ordinary skill in the art would understood at the time of filing of this application that the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU, or processor) 220, in the form of one or more processors, for executing program instructions. The exemplary computer platform may include an internal communication bus 210, a program storage and a data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, the RAM 240, and/or other type of non-transitory storage medium to be executed by the CPU/processor 220. The methods and/or processes of the present disclosure may be implemented as the program instructions. The computing device 200 may also include an I/O component 260, supporting input/output between the computer and other components therein such as a user interface element 280. The computing device 200 may also receive programming and data via network communications.

Merely for illustration, only one CPU/processor 220 is described in the computing device 200. However, it should be note that the computing device 200 in the present disclosure may also include multiple CPUs/processors, thus operations and/or method steps that are performed by one CPU/processor 220 as described in the present disclosure may also be jointly or separately performed by the multiple CPUs/processors. For example, if in the present disclosure the CPU/processor 220 of the computing device 200 executes both step A and step B, it should be understood that step A and step B may also be performed by two different CPUs/processors jointly or separately in the computing device 200 (e.g., the first processor executes step A and the second processor executes step B, or the first and second processors jointly execute steps A and B).

Figure 3:
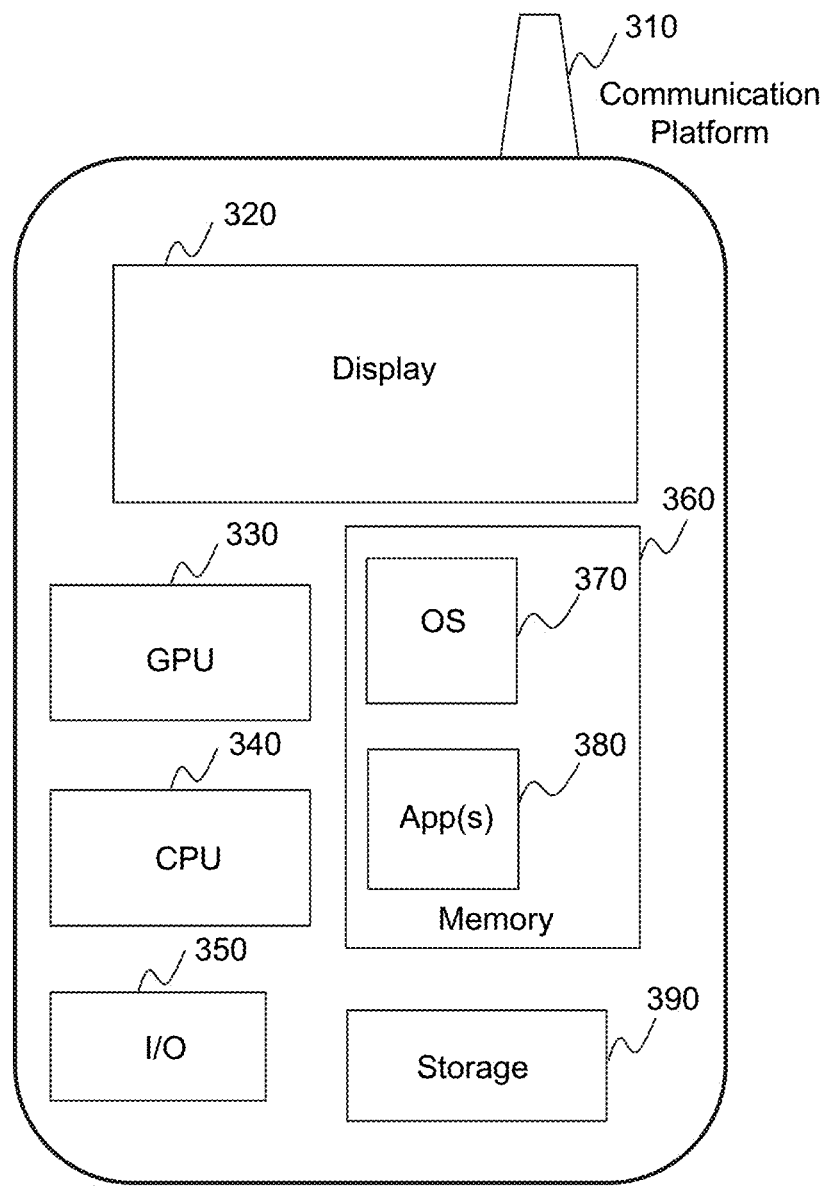
FIG. 3 is a schematic diagram illustrating exemplary hardware and/or software components of an exemplary mobile device on which a use terminal may be implemented according to some embodiments of the present disclosure.

FIG. 3 is a schematic diagram illustrating exemplary hardware and/or software components of an exemplary mobile device 300 on which a use terminal may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 112. User interactions with the information stream may be achieved via the I/O 350 and provided to the processing engine 112 and/or other components of the online to offline service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
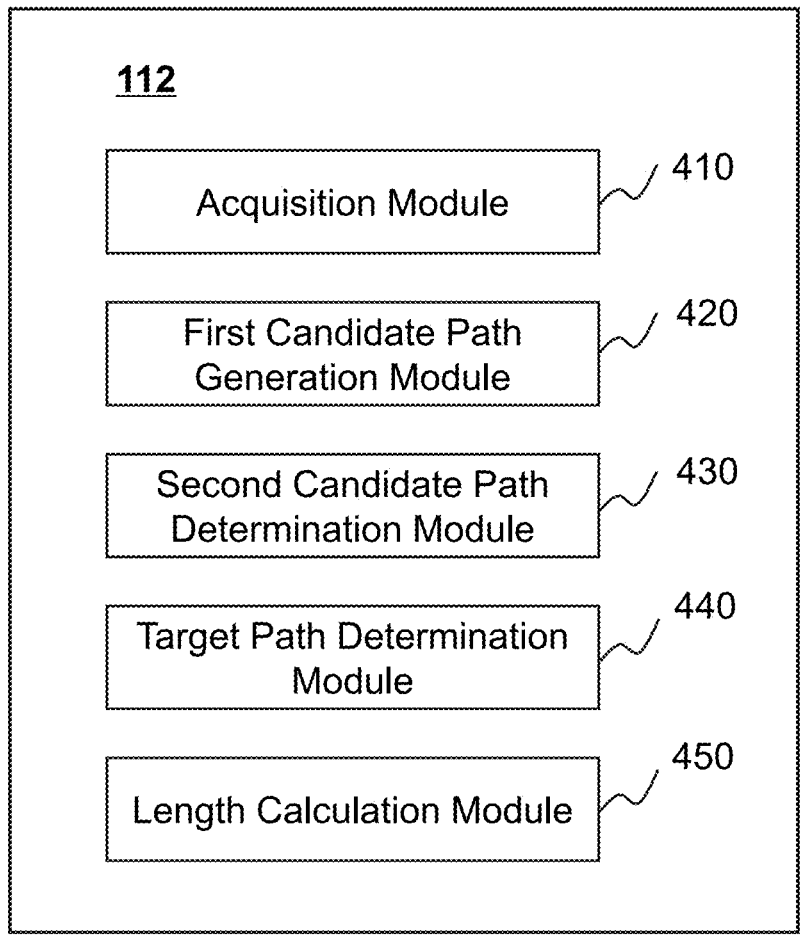
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 112 may include an acquisition module 410, a first candidate path generation module 420, a second candidate path determination module 430, a target path determination module 440, and a length calculation module 450. Each module may be a hardware circuit that is designed to perform certain actions, e.g. according to a set of instructions stored in one or more storage media, and/or any combination of the hardware circuit and the one or more storage media.

The acquisition module 410 may be configured to obtain one or more requests. In some embodiment, the one or more requests may be sent from one or more of the terminals 130. In some embodiments, the one or more requests may be online to offline service requests. Taking a vehicle online to offline order as an example, the one or more requests may be sent from one or more of the terminals 130 by one or more service requestors (e.g., passengers). Each of the one or more requests may include a service requestor's information, such as a starting location, a destination location, starting time, etc. The acquisition module 410 may also be configured to obtain a service provider's information, such as a starting location, a destination location, a vehicle type, a service status, etc. One or more starting locations and one or more destination locations may be referred to as a plurality of nodes. The starting location may refer to a starting node, and the destination location may refer to a destination node. For example, a service requester (e.g., a passenger), via the service requester terminal 130 and the server 110, may send a service request order to the service provider terminal 140. The service request order may relate to the starting location and the destination location. The starting location may correspond to the starting node, and the destination location may correspond to the destination node. In some embodiments, each of the one or more requests may include the starting node, the destination node, and one or more intermediate nodes. The one or more intermediate nodes may be selected or set by the service requester or the service provider. For example, the service provider (e.g., a driver) may set a gas station as the intermediate node. In some embodiments, the plurality of nodes may include a starting location and a destination of the service provider (e.g., a driver). In some embodiments, the service provider does not have a specific destination, and the final destination of the trip is the last passenger's destination.

The first candidate path generation module 420 may be configured to generate a plurality of first candidate paths. The first candidate path generation module 420 may be configured to determine an initial circuit based on the plurality of nodes. In some embodiments, the initial circuit may be an Euler circuit with a first node sequence. The first candidate path generation module 420 may determine a plurality of second node sequences based on the first node sequence and a first condition related to the plurality of nodes. The first candidate path generation module 420 may determine the plurality of the first candidate paths based on the plurality of second node sequences.

The second candidate path determination module 430 may be configured to determine one or more second candidate paths among the plurality of first candidate paths. The second candidate path determination module 430 may determine a reference path among the plurality of first candidate paths. The second candidate path determination module 430 may determine a navigation length for the reference path based on navigation length between neighboring nodes in the reference path. The second candidate path determination module 430 may determine the one or more second candidate paths. The geographical length of a second candidate path may be shorter than the navigation length of the reference path.

The target path determination module 440 may be configured to designate a second candidate path with the shortest navigation length as a target path. In some embodiments, the target path determination module 440 may determine the target path based on the navigation length of each of the one or more second candidate paths. For example, the navigation length of the target path may be the shortest among the one or more second candidate paths. In some embodiments, the target path determination module 440 may determine the target path based on travel time, taking into consideration of navigation length, speed limit, and/or real-time factors such as traffic conditions, weather conditions, and road-work arrangements. In some embodiments, the reference path may be the target path because the navigation length of the reference path may be the shortest among the one or more second candidate paths.

The length calculation module 450 may be configured to calculation a length between any two of the plurality of nodes. The length may include a spherical length, a straight line length, a navigation length, etc. In some embodiments, the length calculation module 450 may determine a geographical length for each of the plurality of first candidate paths based on geographical lengths between any two of the plurality of nodes. The geographical length may refer to a spatial distance between two nodes. In some embodiments, the length calculation module 450 may determine a navigation length of the reference path based on navigation length between neighboring nodes in the reference path. In some embodiments, the length calculation module 450 may determine a navigation length for each of the one or more second candidate paths.

It should be noted that the above descriptions of the processing engine 112 is provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. In some embodiments, the processing engine 112 may include one or more other modules. For example, the processing engine 112 may include a storage module to store data generated by the modules in the processing engine 112. In some embodiments, any two of the modules may be combined as a single module, and any one of the modules may be divided into two or more units.

Figure 5:
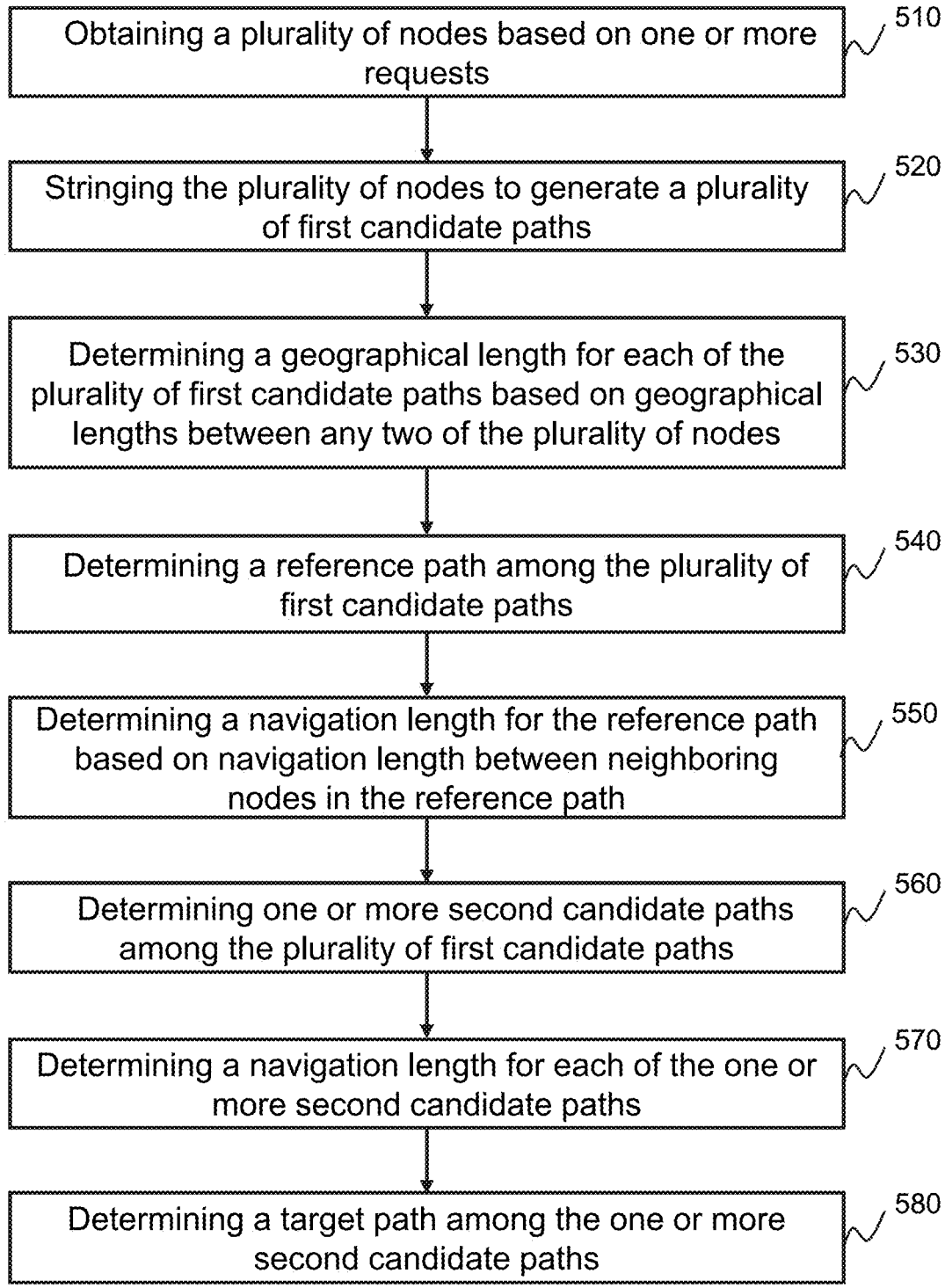
FIG. 5 is a flowchart illustrating an exemplary process for determining a target path according to some embodiments of the present disclosure.

FIG. 5 is a flowchart illustrating an exemplary process for determining a target path according to some embodiments of the present disclosure. In some embodiments, process 500 may be executed by the online to offline service system 100. For example, the process 500 may be implemented as a set of instructions (e.g., an application) stored in storage device 160. In some embodiments, the processing engine 112 may execute the set of instructions and may accordingly be directed to perform the process 500 in an online to offline service platform. The platform may be an Internet-based platform that connects service providers and requesters through the Internet.

In 510, the processing engine 112 (e.g., the acquisition module 410) may obtain a plurality of nodes based on one or more requests. After being processed, the one or more requests may correspond to an online to offline service order (e.g., a carpool service order). For example, a carpool order may include a request A1 from a service requester A for a vehicle and a request B1 from a service requester B for the same vehicle. Each of the one or more requests may include a starting location and a destination location. In some embodiments, the starting location of a request or the destination location of a request may be referred to as a node. The starting location may refer to a starting node, and the destination location may refer to a destination node. For example, a service requester (e.g., a passenger) via the service requester terminal 130 and the server 110 may send a request to the service provider terminal 140. The request may include the starting location and the destination location. The starting location may correspond to the starting node, and the destination may correspond to the destination node. In some embodiments, each of the one or more requests may include the starting node, the destination node, and one or more intermediate nodes. The one or more intermediate nodes may be selected or set by the service requester or the service provider as a passing-by node. For example, the request A1 may include a starting node and a destination node, and an intermediate node may be determined by the service requester A indicating that the service requester A want to pass by the intermediate node during the trip from the starting node to the destination node.

As another example, the processing engine 112 (e.g., the acquisition module 410) may receive a plurality of service requests, including, e.g., a first service request of a first service requester and a second service request of a second service requester. The first service request order may include a first starting location corresponding to a first node, and a first destination location corresponding to a second node. The second order may correspond to a second starting location corresponding to a third node, and a second destination corresponding to a fourth node. Further, the processing engine 112 may obtain six nodes including the first node, the second node, the third node, the fourth node, a fifth node corresponding to the starting location of the service provider (e.g., a driver), and a sixth node corresponding to the destination of the service provider.

In 520, the processing engine 112 (e.g., the first candidate path generation module 420) may string the plurality of nodes to generate a plurality of first candidate paths. For example, a request A1 from a service requester A may include a starting node A' and a destination node B'. A request B1 from a service requester B may include a starting node C' and a destination node D'. The processing engine 112 may string the node A', node B', node C' and node D' in a node sequence, such as ABCD, representing that the vehicle would proceed in a sequence of node A', node B', node C' and node D', to generate a first candidate path. Particularly, the plurality of first candidate paths may satisfy a first condition related to the plurality of nodes. Priority, which refers to a queuing position in a path, of a starting node of the request in the first candidate path is higher than that of a destination node in the first candidate path. For example, according to the first condition, the node B' would not appear before the node A' in the first candidate path, and the node D' would not appear before the node C' in the first candidate path. In some embodiments, the node A' may appear before or after the node C', and the node B' may appear before or after the node D'. A detailed description about generating the plurality of first candidate paths is provided in FIG. 6, and descriptions thereof.

In 530, the processing engine 112 (e.g., the length calculation module 450) may determine a geographical length for each of the plurality of first candidate paths based on geographical lengths between any two of the plurality of nodes. A geographical length may refer to a spatial distance between two nodes. A geographical length between two nodes may be a length of a line segment formed by the two nodes. In some embodiments, considering that earth has a spherical shape, a geographical length between two nodes may be a length of an arc formed by the two nodes on earth. A geographical length for a path (e.g., a first candidate path) is a sum of geographical lengths between any two neighboring nodes in the sequence of the plurality of nodes for the path. For example, using the example described in step 520, a geographical length for the first candidate path A'B'C'D' may refer to a sum of geographical lengths of nodes A' and B', nodes B' and C', and nodes C' and D'. For another example, the processing engine 112 (e.g., the length calculation module 440) may determine a geographical length between two nodes using GPS data related to the two nodes including longitude and latitude. Accordingly, in certain embodiments, determining the geographical length does not require obtaining navigation information between the nodes. In some embodiments, the processing engine 112 (e.g., the length calculation module 450) may determine a geographical length for each of the plurality of first candidate paths.

In 540, the processing engine 112 (e.g., the first candidate path generation module 420) may determine a reference path among the plurality of first candidate paths. In some embodiments, the reference path is a first candidate path that the geographical length of the reference path is the shortest among the plurality of first candidate paths.

In 550, the processing engine 112 (e.g., the length calculation module 450) may determine a navigation length of the reference path based on navigation length between neighboring nodes in the reference path. A navigation length between two nodes may be referred to as a length that a vehicle may driving through. In some embodiments, the navigation lengths are derived from paths that are based on established roads (links). For example, the processing engine 112 may determine a plurality of navigation lengths between neighboring nodes in the reference path. The reference path may include a first node, a second node, a third node, and a fourth node successively. The processing engine 112 may determine a first navigation length between the first node and the second node, a second navigation length between the second node and the third node, and a third navigation length between the third node and the fourth node. Further, the processing engine 112 may determine the navigation length of the reference path by calculating a sum of the first navigation length, the second navigation length, and the third navigation length. A detailed description about determining the navigation length of the reference path may refer to FIG. 8, and descriptions thereof.

In 560, the processing engine 112 (e.g., the second candidate path generation module 420) may determine one or more second candidate paths among the plurality of first candidate paths. In some embodiments, the geographical length of each of the one or more second candidate paths may be shorter than the navigation length of the reference path. A detailed description about generating the plurality of first candidate paths may refer to FIG. 6, and descriptions thereof. In some embodiments, the reference path is one of the second candidate paths. In some embodiments, the reference path is the only second candidate path because no other first candidate path has a geographical length that is shorter than the navigation length of the reference path.

In 570, the processing engine 112 (e.g., the length calculation module 450) may determine a navigation length for each of the one or more second candidate paths. Taking a second candidate path as an example, a method of determining the navigation length for the second candidate path may be the same as the method of determining the navigation length for the reference path that is described in step 550.

Steps 540-570 provide an example for determining the second candidate paths, from which a target path can be selected. It should be noted, however, that there are other embodiments for determining the second candidate paths based on, at least in part, the geographical length of each of the plurality of first candidate paths. For example, after the determination of the geographical lengths of each of the first candidate paths, the processing engine 112 may select a fixed number (e.g., 1, 2, 3, 5, or 10) of the first candidate paths having the shortest geographical length to be the second candidate paths. As another example, the processing engine 112 may first choose a first candidate path having the shortest geographical length as a reference path, and then choose any first candidate path that has a geographical length difference, when comparing to the reference path, less than a predetermined threshold, as a second candidate path.

In 580, the processing engine 112 (e.g., the target path determination module 440) may determine a target path among the one or more second candidate paths. In some embodiments, the target path may be determined based on the navigation length. For example, the navigation length of the target path may be the shortest among the one or more second candidate paths. In some embodiments, the target path may be determined based on travel time, taking into consideration of navigation length, speed limit, and/or real-time factors such as traffic conditions, weather conditions, and road-work arrangements. In some embodiments, the reference path may be the target path because the navigation length of the reference path may be the shortest among the one or more second candidate paths.

It should be noted that the above descriptions of process 500 are provided for the purposes of illustration, and not intended to limit the scope of the present disclosure. For persons having ordinary skills in the art, various modifications and changes in the forms and details of the application of the above method and system may occur without departing from the principles in the present disclosure. However, those variations and modifications also fall within the scope of the present disclosure. In some embodiments, one or more steps may be added or omitted. For example, steps 540 and 550 may be merged into one step. As another example, steps 560 and 570 may be merged into one step.

Figure 6:
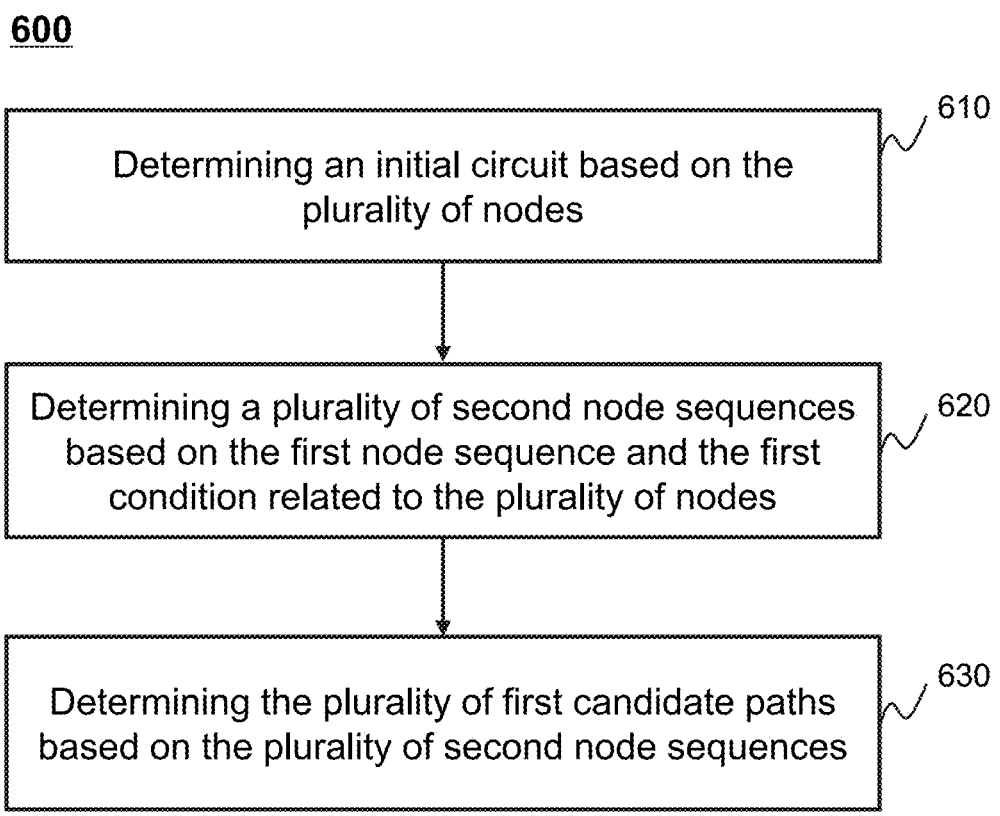
FIG. 6 is a flowchart illustrating an exemplary process for determining the plurality of first candidate paths according to some embodiments of the present disclosure.

FIG. 6 is a flowchart illustrating an exemplary process for determining the plurality of first candidate paths according to some embodiments of the present disclosure. In some embodiments, process 600 may be executed by the online to offline service system 100. For example, the process 600 may be implemented as a set of instructions (e.g., an application) stored in storage device 160. In some embodiments, the processing engine 112 may execute the set of instructions and may accordingly be directed to perform the process 600 in an online to offline service platform. The platform may be an Internet-based platform that connects service providers and requesters through the Internet.

In 610, the processing engine 112 may determine an initial circuit based on the plurality of nodes. In some embodiments, the initial circuit may be an Euler circuit with a first node sequence. The Euler circuit with the first node sequence may be determined based on a Christo fides algorithm and vehicle routing planning (VRP). The Euler circuit may refer to a path including a plurality of sides that pass through each of the plurality of sides only once. For example, the service provider or the vehicle may travel from node A', pass through node B', node C', node D', node E', node F', node G', and node H', and travel back to node A'. The sequence of the points or nodes may be referred to as a first node sequence. For example, the Euler circuit for the trip of the service provider may be represent by the first node sequence (e.g., A'B'C'D'E'F'G'H'A'). In some embodiments, the processing engine 112 may determine one or more Euler circuits of the plurality of nodes.

In 620, the processing engine 112 may determine a plurality of second node sequences based on the first node sequence and the first condition related to the plurality of nodes. In some embodiments, the processing engine 112 may determine the plurality of second node sequences using a 2-optimization algorithm based on the first node sequence and the first condition related to the plurality of nodes. For example, the Euler circuit (e.g., A'B'C'D'E'F'G'H'A') described in step 610 may include a first node sequence, e.g., A'→B'→C'→D'→E'→F'→G'→H'→A'. By randomly selecting two nodes i and k (e.g., i=4, i.e. node D', and k=7, i.e., node G'), a second node sequence may be determined by successively combining a first portion of the initial node sequence before the node i (i.e., A'→B'→C'), an inversed node sequence (i.e., G'→F'→E'→D') that is obtained by inversing a second portion of the first node sequence from the node i to the node j, and a third portion of the initial node sequence after the node j (i.e., H'→A'). The second node sequence may be represented by "A'→B'→C'→G'→F'→E'→D'→H'→A'". Similarly, the processing engine 112 may determine a plurality of second node sequences. Further, the processing engine 112 may determine the plurality of second node sequences by applying the first condition related to the plurality of nodes. For example, if the node B' is a starting node for a service request A1 and node D' is a destination node for the service request A1, and the node E' is a starting node for a service request B1 and node H' is a destination node for the service request B1, a node sequence that node D' appears earlier than node B', or node H' appears earlier than node E' is not a second node sequence.

In 630, the processing engine 112 may determine the plurality of the first candidate paths based on the plurality of second node sequences. A second node sequence may correspond to a first candidate path. For example, the second sequence may be represented by "A'→B'→C'→G'→F'→E'→D'→H'→A'". The processing engine 112 may generate the first candidate path by stringing a plurality of nodes of the second sequence "A'→B'→C'→G'→F'→E'→D'→H'→A'".

FIG. 7 is a flowchart illustrating an exemplary process for determining a second candidate path according to some embodiments of the present disclosure. In some embodiments, process 700 may be executed by the online to offline service system 100. For example, the process 700 may be implemented as a set of instructions (e.g., an application) stored in storage device 160. In some embodiments, the processing engine 112 may execute the set of instructions and may accordingly be directed to perform the process 700 in an online to offline service platform. The platform may be an Internet-based platform that connects service providers and requesters through the Internet.

In 710, the processing engine 112 may determine a plurality of first differences between the geographical length of the reference path and geographical length of each of the plurality of first candidate paths. The geographical length of the reference path may be represented by Q0. The geographical lengths of the plurality of first candidate paths may be represented by Q1, Q2, . . . , Qn, where n may denote number of the first candidate paths. The plurality of first differences between the geographical length of the reference path and geographical length of each of the plurality of first candidate paths may be represented by Q1−Q0, Q2−Q0, . . . , Qn−Q0. In some embodiments, Q0 is one of Q1−Qn. In some embodiments, the determination of the geographical lengths and the first differences does not require access or utilization of the navigation system.

In 720, the processing engine 112 may determine a first parameter based on a difference between the navigation length of the reference path and the geographical length of the reference path. In some embodiments, the navigation length of the reference path may be represented by N0. The difference between the navigation length of the reference path and the geographical length of the reference path may be represented by N0−Q0. Further, the processing engine 112 may determine the first parameter based on the difference between the navigation length of the reference path and the geographical length of the reference path. In some embodiments, the first parameter may be equal to the difference between the navigation length of the reference path and the geographical length of the reference path (i.e., N0−G0). In some embodiments, the first parameter may be equal to a percentage of the difference between the navigation length of the reference path and the geographical length of the reference path (e.g., (N0-G0)*80%).

In 730, the processing engine 112 may assign a corresponding first candidate path as a second candidate path if a first difference of the corresponding first candidate path is smaller than the first parameter. For example, if the first difference of the corresponding first candidate path (e.g., Q2-Q0) is smaller than the first parameter (e.g., N0-G0), the processing engine 112 may assign the corresponding first candidate path (i.e., a first candidate path corresponding to the geographical length Q2) as the second candidate path. Similarly, the processing engine 112 may determine the one or more second candidate paths among the plurality of first candidate paths.

FIG. 8 is a flowchart illustrating an exemplary process for determining the navigation length for the reference path according to some embodiments of the present disclosure. In some embodiments, process 800 may be executed by the online to offline service system 100. For example, the process 800 may be implemented as a set of instructions (e.g., an application) stored in storage device 160. In some embodiments, the processing engine 112 may execute the set of instructions and may accordingly be directed to perform the process 800 in an online to offline service platform. The platform may be an Internet-based platform that connects service providers and requesters through the Internet.

The reference path may include a plurality of sections. Each section may refer to connect two neighboring nodes of the reference path. A section may refer to a connection between two different nodes. In 810, the processing engine 112 may obtain a reference section set including the plurality of sections of the reference path. For example, the reference path may be represented by "1→2→3→4", and the reference section set may include the plurality of sections of the reference path, e.g., "1→2", "2→3", and "3→4". The number from 1 to 4 may denote to a plurality of nodes.

In 820, the processing engine 112 may determine a navigation length of each section in the reference section set to determine the navigation length of the reference path. For example, the reference section set may include the plurality of sections of the reference path, e.g., "1→2", "2→3", and "3→4". The processing engine 112 may determine the first navigation length of section ("1→2"), the second navigation length of section ("2→3"), and the third navigation length of section ("3→4"). Further, the processing engine 112 may determine the navigation length of the reference path by calculating a sum of the first navigation length of section ("1→2"), the second navigation length of section ("2→3"), and the third navigation length of section ("3→4").

Figure 9:
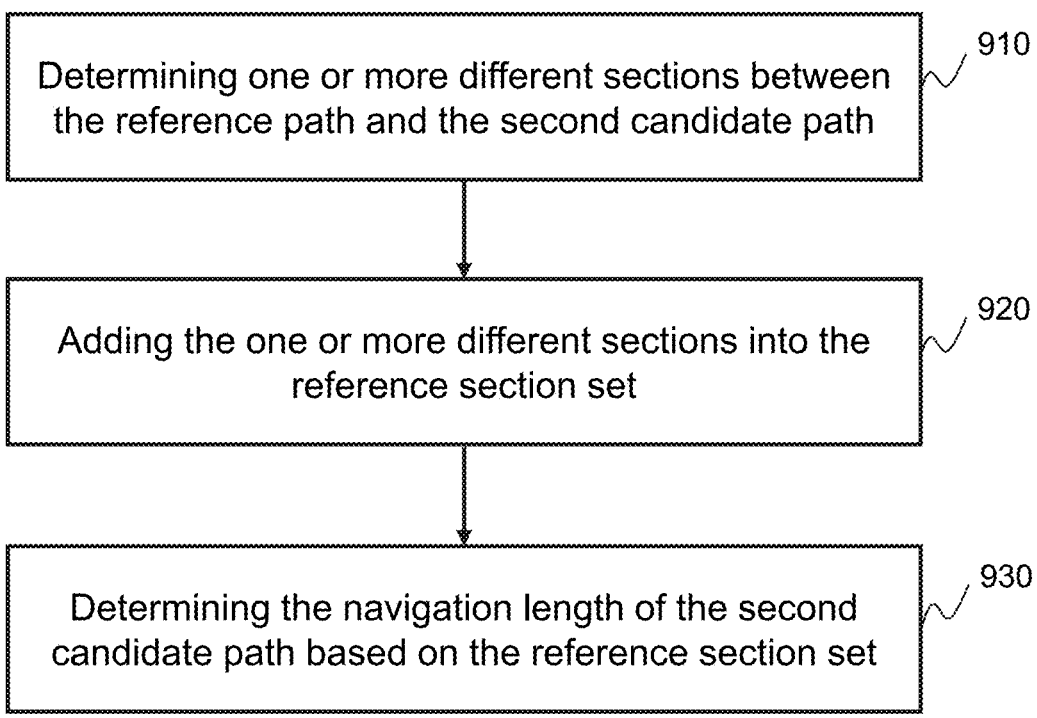
FIG. 9 is a flowchart illustrating an exemplary process for determining the navigation length for each of the one or more second candidate paths according to some embodiments of the present disclosure.

FIG. 9 is a flowchart illustrating an exemplary process for determining the navigation length for each of the one or more second candidate paths according to some embodiments of the present disclosure. In some embodiments, process 900 may be executed by the online to offline service system 100. For example, the process 900 may be implemented as a set of instructions (e.g., an application) stored in storage device 160. In some embodiments, the processing engine 112 may execute the set of instructions and may accordingly be directed to perform the process 900 in an online to offline service platform. The platform may be an Internet-based platform that connects service providers and requesters through the Internet.

Each of the candidate paths may include a plurality of sections. A section may refer to a connection between two different nodes. In 910, the processing engine 112 may determine one or more different sections between the reference path and the second candidate path. For example, the plurality of sections of the reference path may include "1→2", "2→3", and "3→4". A candidate path (e.g., a first candidate path or a second candidate path) may be represented by "1→3→2→4", and the candidate path may include a plurality of sections, e.g., "1→3", "3→2", and "2→4". The one or more different sections between the reference path and the second candidate path may include "1→3", "3→2", and "2→4".

In 920, the processing engine 112 may add the one or more different sections into the reference section set. For example, the plurality of sections of the reference path may include "1→2", "2→3", and "3→4". A second candidate path may be represented by "1→3→2→4", and the candidate path may include a plurality of sections, e.g., "1→3", "3→2", and "2→4". The one or more different sections between the reference path and the second candidate path may include "1→3", "3→2", and "2→4". The processing engine 112 may add the one or more different sections into the reference section set, and the reference section set may become a new plurality of sections include "1→2", "2→3", "3→4", "1→3", "3→2", and "2→4". The processing engine 112 may store the reference section set into the storage device 160.

In 930, the processing engine 112 may determine the navigation length of the second candidate path based on the reference section set. The processing engine 112 may determine a plurality of sections of a second candidate path and retrieve the plurality of sections of the second candidate path from the storage device 160. For example, for second candidate path "1→3→2→4", the processing engine 112 may retrieve the "1→3", "3→2", and "2→4" pre-stored in the storage device 160.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system for determining a target path for an online to offline service, comprising:
    at least one non-transitory computer-readable storage medium including a set of instructions;
    at least one processor in communication with the at least one non-transitory computer-readable storage medium, wherein when executing the instructions, the at least one processor is directed to:
    connect a plurality of nodes to generate a plurality of first candidate paths, wherein the plurality of nodes are determined based on one or more requests received from a service requester terminal via a network, and the plurality of first candidate paths satisfy a first condition related to the plurality of nodes;
    determine a geographical length for each of the plurality of first candidate paths based on geographical distances between any two of the plurality of nodes;
    determine a reference path among the plurality of first candidate paths, wherein the geographical length of the reference path is the shortest among the plurality of first candidate paths;
    determine a navigation length for the reference path based on one or more navigation lengths each of which between a pair of neighboring nodes in the reference path;
    determine one or more second candidate paths among the plurality of first candidate paths based on the geographical length for each of the plurality of first candidate paths and the navigation length of the reference path, wherein the geographical length of the one or more second candidate paths is shorter than the navigation length of the reference path;
    determine the navigation length for each of the one or more second candidate paths; and
    determine a target path among the one or more second candidate paths based on the one or more navigation lengths of the one or more second candidate paths, wherein the navigation length of the target path is the shortest among the one or more second candidate paths.

2. The system of claim 1, wherein to determine the one or more second candidate paths among the plurality of first candidate paths, the at least one processor is further directed to:
    determine a plurality of first differences between the geographical length of the reference path and the geographical length of each of the plurality of first candidate paths;
    determine a first parameter based on a difference between the navigation length of the reference path and the geographical length of the reference path; and
    assign a corresponding first candidate path as a second candidate path if a first difference of the corresponding first candidate path is smaller than the first parameter.

3. The system of claim 1, wherein:
    each of the second candidate paths includes one or more sections, each section connecting two neighboring nodes of the second candidate path,
    to determine a navigation length for the reference path, the at least one processor is further directed to:
    obtain a reference section set including a plurality of sections of the reference path, and
    determine the navigation length of each section in the reference section set to determine the navigation length of the reference path.

4. The system of claim 3, wherein:
to determine the navigation length for each of the one or more second candidate paths, the at least one processor is further directed to:
determine one or more different sections between the reference path and the second candidate path;
add the one or more different sections into the reference section set; and
determine the navigation length of the second candidate path based on the reference section set.

5. The system of claim 4, wherein a section of the second candidate path is not a different section if:
the node sequence of the section of the second candidate path is opposite to a node sequence of a section of the reference path, and
a difference between the navigation length and the geographic length of the section does not exceed a threshold.

6. A method for determining a target path for an online to offline service implemented on at least one device each of which has at least one processor and a storage medium, the method comprising:
connecting a plurality of nodes to generate a plurality of first candidate paths, wherein the plurality of nodes are determined based on one or more requests received from a service requester terminal via a network, and the plurality of first candidate paths satisfy a first condition related to the plurality of nodes;
determining a geographical length for each of the plurality of first candidate paths based on geographical distances between any two of the plurality of nodes;
determining a reference path among the plurality of first candidate paths, wherein the geographical length of the reference path is the shortest among the plurality of first candidate paths;
determining a navigation length for the reference path based on one or more navigation lengths each of which between a pair of neighboring nodes in the reference path;
determining one or more second candidate paths among the plurality of first candidate paths based on the geographical length for each of the plurality of first candidate paths and the navigation length of the reference path, wherein the geographical length of the one or more second candidate paths is shorter than the navigation length of the reference path;
determining the navigation length for each of the one or more second candidate paths; and
determining a target path among the one or more second candidate paths based on the one or more navigation lengths of the one or more second candidate paths, wherein the navigation length of the target path is the shortest among the one or more second candidate paths.

7. The method of claim 6, wherein to determine the one or more second candidate paths among the plurality of first candidate paths, the method further comprises:
determining a plurality of first differences between the geographical length of the reference path and the geographical length of each of the plurality of first candidate paths;
determining a first parameter based on a difference between the navigation length of the reference path and the geographical length of the reference path; and
assigning a corresponding first candidate path as a second candidate path if a first difference of the corresponding first candidate path is smaller than the first parameter.

8. The method of claim 6, wherein:
each of the second candidate paths includes one or more sections, each section connecting two neighboring nodes of the second candidate path,
to determine the navigation length for the reference path, the method further comprises:
obtaining a reference section set including a plurality of sections of the reference path, and
determining a navigation length of each section in the reference section set to determine the navigation length of the reference path.

9. The method of claim 8, wherein:
to determine the navigation length for each of the one or more second candidate paths, the method further comprises:
determining one or more different sections between the reference path and the second candidate path;
adding the one or more different sections into the reference section set; and
determining the navigation length of the second candidate path based on the reference section set.

10. The method of claim 9, wherein a section of the second candidate path is not a different section if:
the node sequence of the section of the second candidate path is opposite to a node sequence of a section of the reference path, and
a difference between the navigation length and the geographic length of the section does not exceed a threshold.

* * * * *